(12) United States Patent
Naud et al.

(10) Patent No.: US 6,955,117 B2
(45) Date of Patent: Oct. 18, 2005

(54) TOOL FOR A FOOD PROCESSING MACHINE, IN PARTICULAR OF THE MIXER TYPE, AND A MACHINE PROVIDED WITH A TOOL OF THIS TYPE

(75) Inventors: Georges Naud, Aubusson (FR);
Christophe Lagier, Aubusson (FR);
Bruno Paturel, Aubusson (FR)

(73) Assignee: Dito Sama, Aubusson (FR)

( * ) Notice: Subject to any disclaimer, the term of this patent is extended or adjusted under 35 U.S.C. 154(b) by 0 days.

(21) Appl. No.: 10/814,279

(22) Filed: Apr. 1, 2004

(65) Prior Publication Data
US 2004/0261629 A1    Dec. 30, 2004

(30) Foreign Application Priority Data
May 9, 2003    (FR) .................... 03 05635

(51) Int. Cl.$^7$ .......................... A23L 1/00; A47J 27/00; B01F 7/16; B01F 7/20

(52) U.S. Cl. .................. 99/348; 99/645; 366/129; 366/279

(58) Field of Search ................ 99/348, 345, 645; 366/129, 130, 279, 83, 257, 144–147, 197, 366/601, 344, 342, 140, 282, 605; 416/63, 416/35, 95, 76, 122, 176, 146 R; 241/282.2, 241/282.1, 199.9, 100, 65

(56) References Cited

U.S. PATENT DOCUMENTS

| 3,299,924 A | | 1/1967 | Hanschitz |
| 5,368,384 A | * | 11/1994 | Duncan et al. ............ 99/348 X |
| 5,836,684 A | * | 11/1998 | Safont et al. ............. 99/348 X |
| 6,186,056 B1 | * | 2/2001 | Bruno et al. .................. 99/348 |
| 6,186,656 B1 | * | 2/2001 | Penaranda et al. .......... 366/129 |
| 6,193,404 B1 | | 2/2001 | Calange |
| 6,293,691 B1 | * | 9/2001 | Rebordosa et al. ......... 366/129 |

FOREIGN PATENT DOCUMENTS

| FR | 2 780 264 A1 | 12/1999 |
| WO | WO 01 84 996 A1 | 11/2001 |
| WO | WO 03 003 889 A1 | 1/2003 |

* cited by examiner

Primary Examiner—Timothy F. Simone
(74) Attorney, Agent, or Firm—Sughrue Mion, PLLC

(57) ABSTRACT

A tool has: a tubular casing (11); and drive shaft (13); and a centering and guiding element (15) for the drive shaft (13). The tubular casing (11) and the drive shaft (13) are provided, at the same first end, with removable means (21, 25) for locking to the machine body (3) and releasable means (45) for coupling to a main shaft (41) of the machine, respectively. The centering and guiding element (15) has removable means (71, 73) for fixing to the tubular casing (11). The locating element (15) is mounted in the tubular casing (11) at the side of the first end, and the fixing means (71, 73) thereof are suitable for being locked in a correct fixing position by complementary locking means (47) provided on the machine (3) when the tubular casing (11) is fixed to the machine body (3).

12 Claims, 3 Drawing Sheets

TOOL FOR A FOOD PROCESSING MACHINE, IN PARTICULAR OF THE MIXER TYPE, AND A MACHINE PROVIDED WITH A TOOL OF THIS TYPE

BACKGROUND OF THE INVENTION

The present invention relates to a tool for a food processing machine, comprising:
a tubular casing,
a shaft for rotatingly driving a food processing element, and
a centering and guiding element which ensures that the drive shaft is mounted for rotation in the tubular casing, the tubular casing and the drive shaft being provided, at the same first end, with removable means for locking to a machine body and releasable means for coupling to a main shaft of the machine, respectively,
the centering and guiding element comprising removable means for fixing to the tubular casing in order to allow the drive shaft to be disassembled from the tubular casing.

A tool of this type has, for example, been described in the French Patent Application in the name of the same Applicant, published under the number 2 780 264.

The tool described in this previous application comprises a removable roller bearing which is fixed in the tubular casing at the side of that end of the drive shaft on which the food processing element is mounted, that is to say, at the opposite side to the end which is coupled to the main shaft.

It has been found that, depending on the type of removable locking means provided on this bearing, the bearing and therefore the drive shaft could inadvertently become disassembled when the tool was operated.

Inadvertent disassembly of this type can result from the bearing not being completely mounted beforehand in the tubular casing and/or from the locking means of the bearing being retained in an excessively weak manner relative to the mechanical forces applied to the bearing (weight of the drive shaft, centrifugal forces, vibration phenomena etc . . . ).

SUMMARY OF THE INVENTION

The principal object of the invention is to prevent undesirable disassembly of the centering and guiding means, in particular during the operation of the tool, and to provide an optimum level of safety for the machine when it is provided with a tool of this type.

To this end, in a tool according to the invention, the centering and guiding element is mounted in the tubular casing at the side of the first end and these fixing means are suitable for being locked in a correct position for fixing to the tubular casing by complementary locking means provided on the machine body when the tubular casing is fixed to the machine body in order to prevent the drive shaft from becoming inadvertently disassembled from the tubular casing when the tool is operated.

According to other features of the invention:
the fixing means of the centering and guiding element are suitable for preventing the tubular casing from being fixed to the machine body when the fixing means are in an incorrect position for fixing to the tubular casing;
the fixing means of the centering and guiding element are suitable for preventing the drive shaft and the main shaft from being coupled when the fixing means are in an incorrect position for fixing to the tubular casing;
the centering and guiding element comprises a ring and a roller bearing which is arranged in the ring and which receives the drive shaft for rotation, and the tubular casing is provided with a radial shoulder which forms an axial stop, whilst the fixing means comprise at least one resilient lug which protrudes axially from the ring, the resilient lug having a free end which is turned at the side of the first end, the resilient lug being provided with a complementary hook for the radial shoulder and being capable of being deflected in a radial manner between a rest position, in which the hook is able to co-operate with the shoulder of the tubular casing in order to define the correct position for fixing the centering and guiding element in the tubular casing, and an inwardly bent position; and
the means for locking the tubular casing to the machine body comprise, at the side of the first end, at least one flexible axial resilient arm which is provided with a hook which is able to co-operate with a complementary shoulder of the machine body in order to form a snap-fitting connection.

The invention also relates to a food processing machine comprising a tool of the type previously described, a machine body to which the tool is removably fixed, and complementary means for locking the means for fixing the drive shaft to the tubular casing, the locking means being provided on the machine body.

According to other features of the machine according to the invention:
the complementary locking means are suitable for co-operating with the means for fixing the centering and guiding element in order to prevent the tubular casing from being fixed to the machine body if the fixing means are in an incorrect position for fixing to the tubular casing;
the complementary locking means are suitable for co-operating with the means for fixing the centering and guiding element in order to prevent the drive shaft and the main shaft from being coupled when the fixing means are in an incorrect position for fixing to the tubular casing;
the locking means comprise a rigid wall which is fixedly connected to the machine body and which extends axially at the side of the end at which the main shaft is coupled to the drive shaft of the tool, the wall being suitable for blocking the deflection of the resilient lug when in a completely assembled position which corresponds to the correct position for fixing the ring in the tubular casing and to the position for locking the tubular casing to the machine body;
the rigid wall has an outer surface which substantially comes into contact with the inner surface of the resilient lug, in the completely assembled position;
the rigid wall is a cylindrical wall which is coaxial with the main shaft and which has an outside diameter which is substantially equal to, whilst being less than, the distance from the inner surface of the resilient lug to the axis of the drive shaft; and
the main shaft is provided with a driving means such that the end of the drive shaft of the tool and the driving means co-operate, when in a completely assembled position, over an axial driving length and, when in a completely assembled position, the rigid wall covers the resilient lug over an axial interference length, so that the interference length is greater than the driving length.

BRIEF DESCRIPTION OF THE DRAWINGS

A particular embodiment of the invention will now be described in greater detail with reference to the appended drawings, in which.

DETAILED DESCRIPTION OF THE INVENTION

Figure 1:
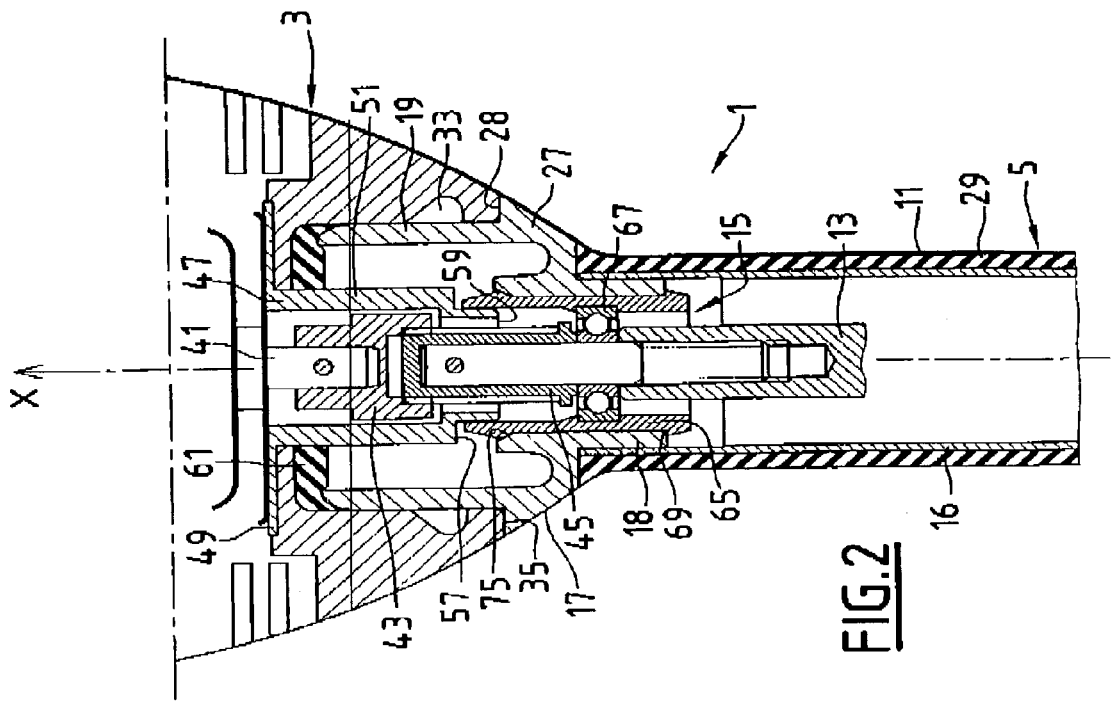
FIG. 1 is a partial sectioned view of a machine according to the invention, in a longitudinal axial plane, the tool being in a position in which it is completely assembled on the machine body.
Figure 2:
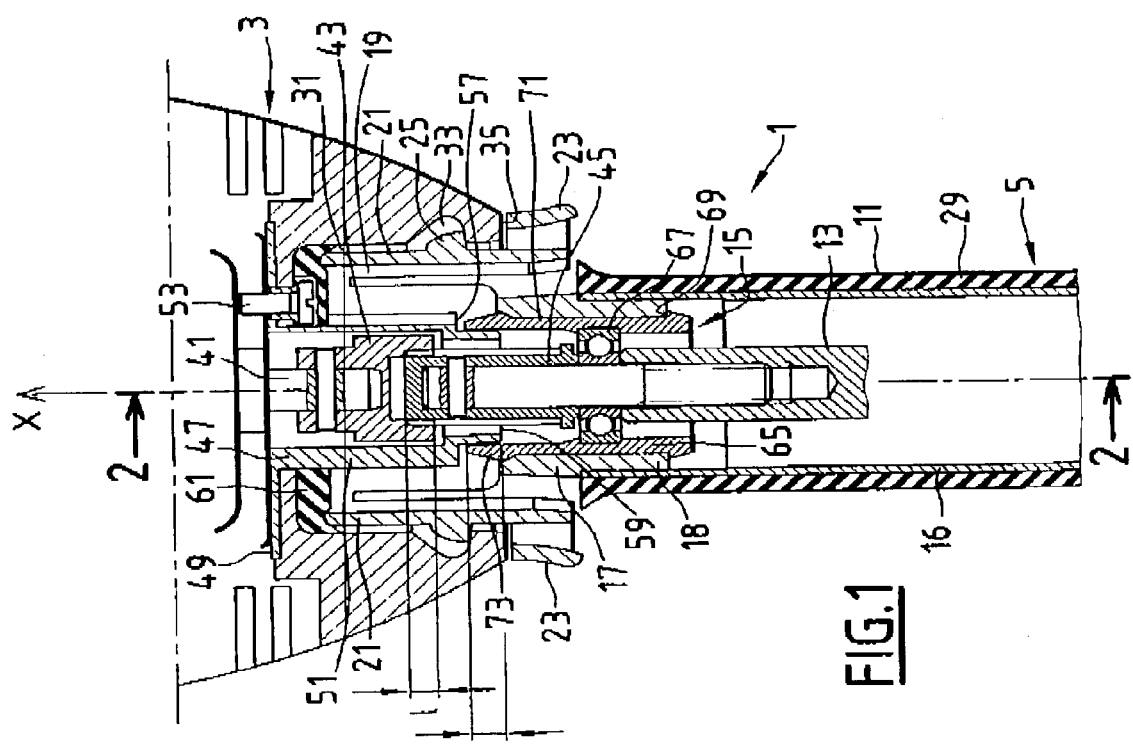
FIG. 2 is a similar view, in the plane indicated by line 2—2 in FIG. 1.

FIGS. 1 and 2 illustrate a machine 1 according to the invention, of the type commonly known as a "mixer", this machine comprising a body 3, in which an electric motor (not shown) is arranged, and a tool 5 for processing food.

The tool 5 comprises a food processing element, such as a blade or knife, which can be rotatingly driven by the motor of the machine along an axis of rotation X which defines the axis of the machine 1.

The machine shown in the Figures in order to illustrate the invention is generally used with axis X thereof held in a vertical manner, the tool 5 being introduced into a receptacle which contains the foods to be processed. For this reason, for the ease of the following description, axis X of the machine 1 will be assumed to be vertical, orientated from the bottom to the top relative to the normal position of use of the machine.

The tool 5 substantially comprises a tubular casing 11, of a substantially cylindrical general form, and a shaft 13 for rotatingly driving the food processing element. The processing element which is fixed to the drive shaft 13 in a lower end portion of the drive shaft 13 has not been shown. It is generally protected by a bell-shaped member which belongs to the tool and which is fixedly connected to the tubular casing, this bell-shaped member also not being shown.

The drive shaft 13 is rotatingly mounted in a coaxial and removable manner inside the tubular casing 11. To this end, the tool 5 is provided with means for centering and guiding the drive shaft 13 inside the tube 11.

These centering and guiding means comprise in particular a roller bearing 15 which is mounted on the drive shaft 13 in an upper end region of the drive shaft 13. The bearing 15, as will be seen below, is provided with removable means for fixing inside the tube 11, which means co-operate with complementary means provided at the side of the upper end of the tube 11. The bearing 15 ensures, in the region of the respective upper ends of the tube 11 and the shaft 13, a connection of the type having a pivot with axial stopping of the shaft 13 on the tube 11, this connection being detachable.

The centering and guiding means can also comprise a second roller bearing (not shown) which is fixedly connected to the shaft 13 in a lower end region, the bearing being able to come to an axial stop against an inner shoulder of the tube 11.

The tubular casing 11 comprises a main tube 16 which is preferably produced from metal and which extends over the main part of the length of the tubular casing, and an end piece 17 which is permanently fixed to the upper end of the main tube 16 and which ensures that the tubular casing 11 is removably fixed to the machine body 3.

Figure 3:
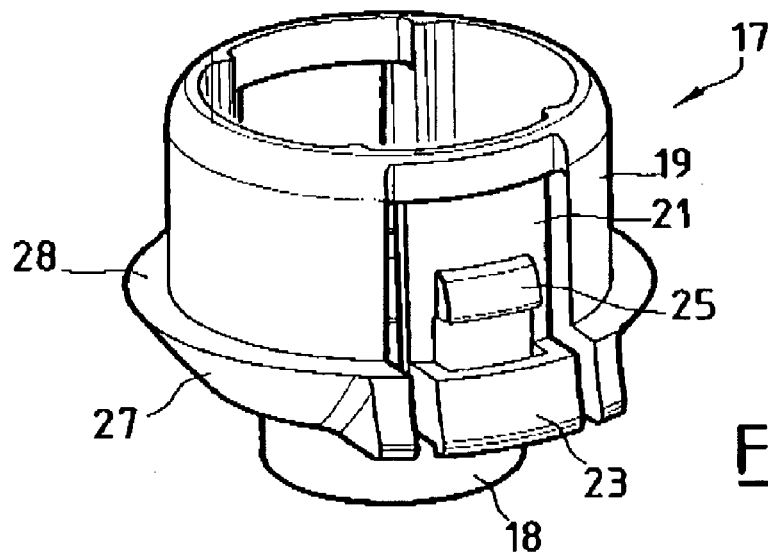
FIG. 3 is a perspective view of the end piece for fixing the tool to the machine body.

Reference can now be made to FIGS. 1 to 3 for the detailed description of the end piece 17.

This end piece 17, which is preferably produced from plastics material, is substantially constituted by a first cylindrical portion 18 and a second cylindrical portion 19 of a larger diameter. The end piece 17 is fitted coaxially to the main tube 16 by insertion of the first cylindrical portion 18 whose outside diameter is adjusted to the inside diameter of the main tube 16.

The second cylindrical portion 19 protrudes axially and radially from the main tube 16. This portion 19 carries removable means for fixing the tubular casing 11 to the machine body 3, in the form of a pair of resilient arms 21 which extend axially and in a mutually symmetrical manner relative to an axial plane. Each arm 21 protrudes into the peripheral wall of the second portion 19 and is attached to the peripheral wall at the upper end thereof that defines a hinge for flexing the arm 21. The lower end of the arm 21 is free and supports a radially protruding control button 23. In an intermediate region, each arm 21 is provided with a radially protruding stud 25 which forms a locking hook.

The end piece 17 also has, in a transition region between the cylindrical portions 18, 19, a frustoconical collar 27 whose base 28 having a larger diameter extends in a peripheral manner relative to the base of the second portion 19, with an annular shoulder being defined which is provided in order to limit the axial engagement of the tubular casing 11 in the machine body 3.

The permanent rigid connection between the main tube 16 and the end piece 17 is secured by a sleeve 29 which is of general cylindrical form and which extends from the collar 27 around the main tube 16 over a portion of the length thereof. The sleeve 29, which is preferably produced from plastics material, can define a handle for gripping the tool 5. The sleeve 29 can be formed, for example, by plastics material being over-moulded on the main tube 16 and the end piece 17, which have been assembled beforehand.

With reference once more to FIGS. 1 and 2, the portion of the machine body 3, in which portion the tool 5 is received, will now be described in greater detail.

The body 3 has an axial hole 31 which opens out at the lower side of the machine body 3. This hole 31 is of a substantially cylindrical general form, suitable for receiving the first portion 19 of the end piece 17 with axial engagement. An annular groove 33 is provided which opens into the hole 31 and which defines a complementary stop notch for the hooks 25. The machine body 3 also has a lower face, into which the hole 31 opens, this face being provided with an annular rim 35 which forms a stop for the shoulder 28 of the tool.

The main shaft 41 of the machine protrudes axially inside the hole 31 from the base of the hole 31. The main shaft 41 is provided at the free end thereof with a rotatingly connected driving means 43 which can be coupled in a releasable manner to a complementary driving means 45 provided at the upper end of the drive shaft 13 of the tool. The releasable coupling of the two driving means 43, 45 can, for example, be carried out via complementary axial ribs and grooves.

Figure 4:
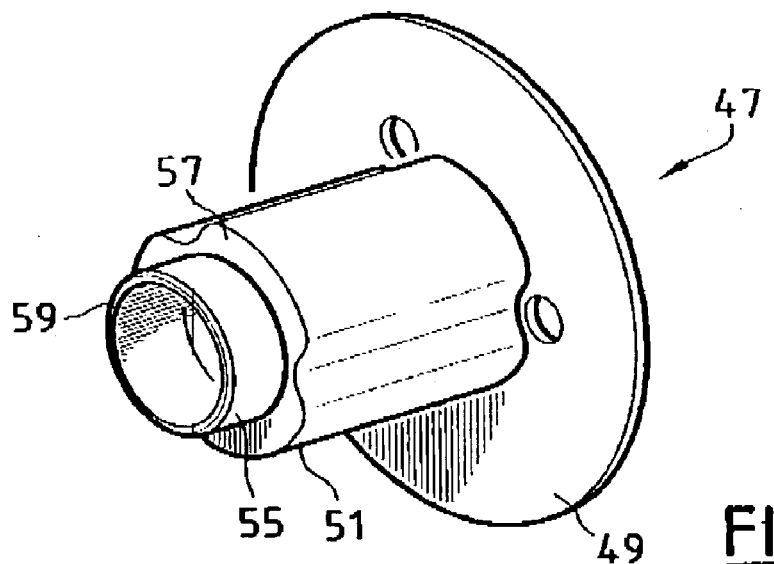
FIG. 4 is a perspective view of the means for locking the centering and guiding element.

The machine body 3 is fixedly connected to a locking and detecting element 47, which is illustrated alone in FIG. 4.

This locking and detecting element 47 is constituted substantially by a plate 49 for fixing to the body 3 and a substantially cylindrical central bush 51 having an axis which is orthogonal relative to the plate. The plate 49 is fixed rigidly to the body 3 at the base of the hole 31 by means of screws 53. The plate 49 is of annular form having a central hole through which the main shaft 41 extends. The bush 51 protrudes inside the hole 31 and completely surrounds the driving means 43. A coaxial cylindrical wall 55 having a smaller diameter is formed at the lower end of the bush, with a substantially annular shoulder 57 being defined at the base thereof and a stop edge 59 at the free end thereof.

In the example shown, the base of the hole 31, around the bush 51, is covered by an elastomer cover 61 which is fixedly connected to the body 3.

Figure 5:
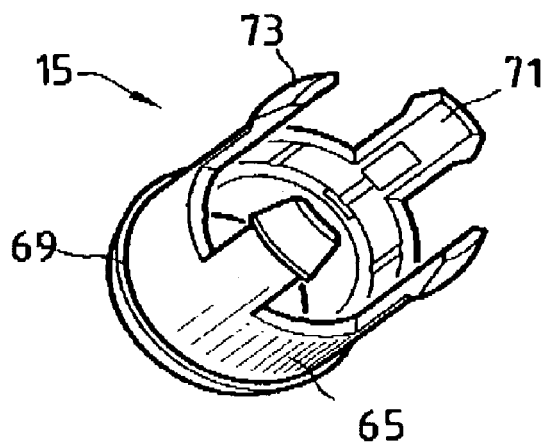
FIG. 5 is a partial perspective view of the centering and guiding element.

The bearing 15 will now be described in greater detail with reference to FIGS. 1, 2 and 5.

The bearing 15 substantially comprises a substantially cylindrical ring 65 of plastics material, a bearing 67 (not shown in FIG. 5), for example, a ball bearing, which is arranged inside the ring 65, and releasable means for fixing the bearing 15 inside the tubular casing 11.

The ring 65 has external dimensions which are adjusted to the internal dimensions of the first cylindrical portion 18 of the end piece 17, so that the bearing can be inserted axially, with no radial play, inside the portion 18.

The releasable means for fixing the bearing 15 comprise, at the lower end of the ring 65, an annular collar 69 which defines, with the lower edge of the portion 18, an axial stop in a first direction, and flexible lugs 71 which are integral with the ring 65 and which protrude axially upwards from the ring 65. Each flexible lug has, at the free end thereof, a hook 73 which projects radially outwards. The hooks 73 define, with an inner frustoconical surface 75 which is widened towards the top of the portion 18, an axial stop in the second direction of the bearing 15 relative to the tubular casing 11.

The method of assembling the drive shaft 13 inside the tubular casing 11 by means of the bearing 15 will be readily appreciated: with the bearing 15 being fixedly connected to the drive shaft 13, and the end piece 17 being fixed rigidly to the main tube 16, the drive shaft 13 and the bearing 15 thereof are inserted inside the tubular casing 11 and they are made to slide upwards until the flexible lugs 71 come into contact with the lower edge of the portion 18. By continuing the insertion movement, the lugs 71 bend in a resilient manner towards axis X and are resiliently returned towards the rest position thereof when the hooks 73 reach the widened end part of the portion 18. The collar 69 then abuts the lower edge of the portion 18 and the bearing 15 is thus stopped relative to the tubular casing 11 in the normal axial operating position thereof.

As will be explained below, the mounting of the drive shaft 13 and the bearing 15 inside the tubular casing 11 must be carried out before the tool 5 is fixed to the machine body 3.

Once the tool has been assembled in this manner, the user can mount the tool 5 on the machine body 3.

To this end, the user axially inserts the end piece 17 inside the hole 31. When the end piece 17 enters the hole 31, the hooks 25 come into contact with the outer rim 35, which causes the arms 21 to bend towards axis X. If the insertion of the end piece 17 into the hole 31 is continued, the upper end of the end piece 17 is supported on the elastomer cover 61 and compresses it slightly, whilst the hooks 25 fall into the annular groove 33, which causes the arms 21 to return in a resilient manner to the rest position thereof. If the insertion action is continued, the annular shoulder 28 of the collar 27 abuts the rim 35 of the machine body 3. Under the action of the resilient reaction of the elastomer cover 61 on the end piece 17, the hooks 25 are pressed in the groove 33 into the stop position thereof. The tool 5 is thus axially immobilised relative to the body 3.

In a more general manner, the elastomer cover 61 ensures functions relating to compensating for the axial clearance, damping of vibrations and electrical isolation, in particular relative to the screws 53.

The cover further ensures a sealing function and has a shape which is intended to facilitate the cleaning thereof. In this manner, it contributes to an improvement in the hygiene of the machine.

At the end of the operation of mounting the tool 5 in the machine body 3 which has just been described, the assembled configuration illustrated in FIGS. 1 and 2 is achieved.

As shown in these Figures, in this configuration, the driving means 43, 45 of the main shaft 41 and the drive shaft 13 respectively are coupled over a length 1 known as the "driving length".

It has also been found that the flexible lugs 71 of the bearing 15 are engaged on the end cylindrical wall 55 of the locking element 47: the inner wall of a lug 71 covers, over a length L known as the "interference length", the outer face of the cylindrical wall 55, preferably with no contact but with a very small spacing. In the example shown, the inner face of each flexible lug 71, at least in the region of the free end, belongs to a notional cylindrical surface which is coaxial with the ring 65 and whose diameter is substantially equal to, whilst being greater than, the outer diameter of the cylindrical wall 55 of the locking element 47. It is advantageous for the diameter of the notional surface to correspond with the diameter of this notional surface defined by the lugs 71 when they are in the rest position thereof.

The cylindrical wall 55 of the locking element 47 is rigid (having a rigidity in terms of flexion which is much greater than that of the lugs 71) and consequently blocks the deflection of the lugs 71 in terms of flexion when the bearing 15 is in the completely assembled position in the tubular casing 11 and the tool in the body 3. The element 47 thus prevents the unlocking of the means for fixing the bearing to the tubular casing.

When the machine is operated in this completely assembled position, the drive shaft 13 is consequently not at risk of inadvertently becoming disassembled.

In the embodiment which has just been described:

the axial length of the cylindrical wall 55 is greater then the interference length L;

the flexible lugs 71 and the hooks 73 thereof are provided so that the deflection thereof in terms of flexion, during insertion into the portion 18, is greater than the spacing between, on the one hand, the notional surface defined by the inner face of the lugs 71 and, on the other hand, the outer surface of the cylindrical wall 55;

in the completely assembled position, the upper end of the portion 18 and the outer surface of the wall 55 have a relative arrangement in which they together block the passage of the free end of the lugs 71 in the axial direction.

It will be appreciated that, in order to disassemble the tool 5 from the machine body 3, starting from the position shown in FIGS. 1 and 2, it is simply necessary for a user to press on the buttons 23 of the sleeve 17 in order to extract the hooks 25 from the groove 33 and to release the tubular casing 11 from the hole 31 by means of axial withdrawal.

Figure 6:
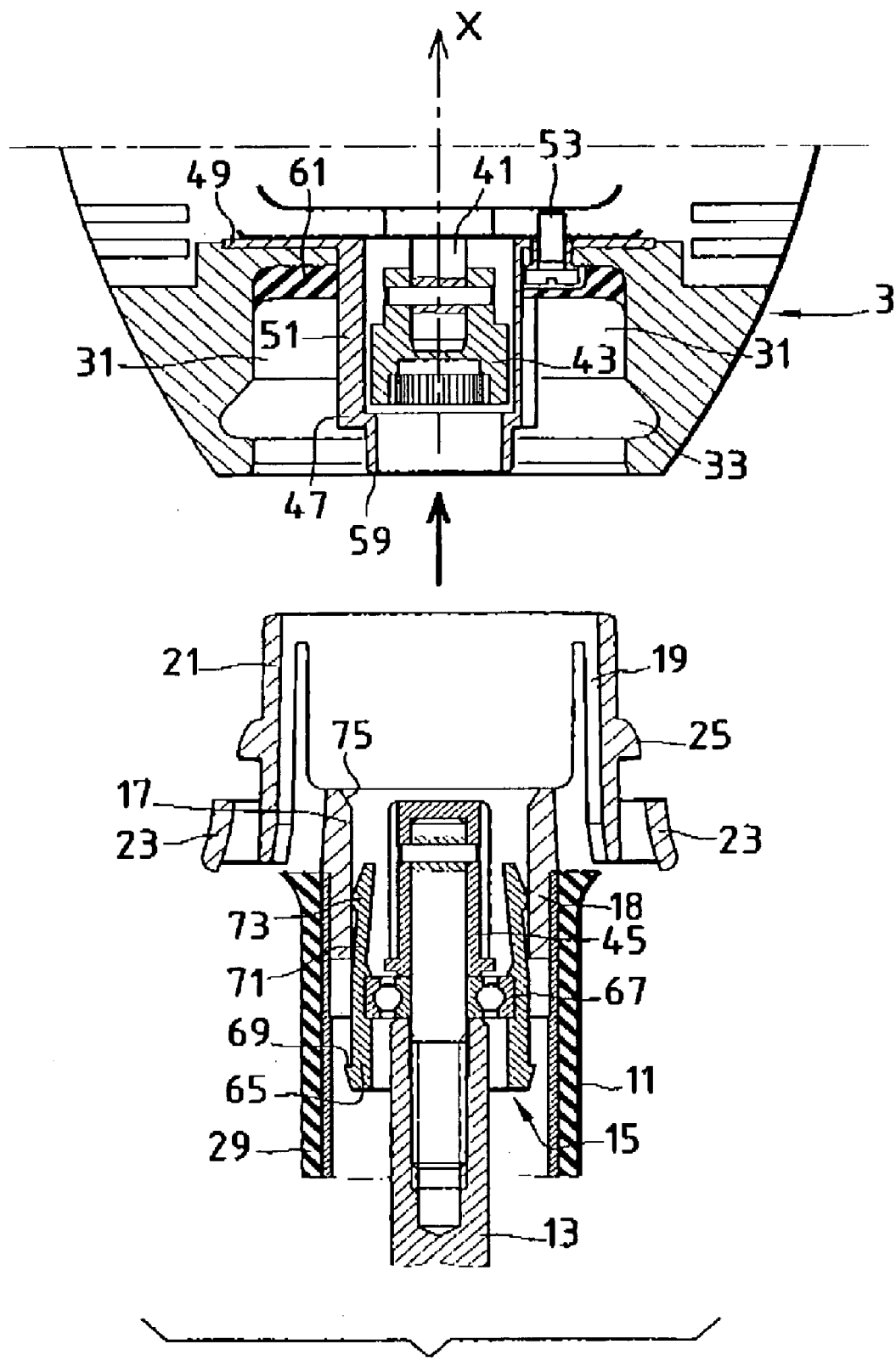
FIG. 6 is a view similar to FIG. 1, in which the centering and guiding element is in a position in which it is not completely fixed in the tubular casing, and the tubular casing is in a position in which is it disassembled from the machine body.

With reference to FIG. 6, a situation will now be described in which the bearing 15 is not completely assembled and is fixedly connected to the drive shaft 13 inside the tubular casing 11.

In a configuration of this type, the bearing 15 is, for example, introduced in an incomplete manner inside the portion 18 of the end piece 17 so that the flexible lugs 71 are held in a position bent towards axis X. When a user attempts to mount the tool 5 on the machine body 3, the free ends of the lugs 71 are not far enough away from insertion axis X to slide on the outer surface of the cylindrical end wall 55 of the locking element 47. These free ends abut the stop edge 59 of the locking element 47. As a result, the user cannot continue the insertion of the end piece 17 into the hole 31 in the normal manner and cannot reach the locking position of the hooks 25 in the groove 33. If he applies force to arrive at this locking position of the end piece in the hole, the user brings about an additional extraction of the drive shaft which is partially pushed out of the tubular casing 11. This clear extraction gives the user a visual indication that the drive shaft is incorrectly assembled in the tubular casing.

Owing to the fact that driving length l is less than interference length L, the driving means 43, 45 are never engaged when the bearing 15 is incompletely mounted in the tubular casing 11 in this manner.

As a result of this arrangement, even if the electric motor is supplied with electricity in order to rotate the main shaft 41, the rotational movement cannot be transmitted to the drive shaft 13 if the drive shaft is not completely engaged with the bearing 15 thereof in the tubular casing 11. This provides an increased level of reliability for the user and prevents the driving means 43, 45 from being destroyed.

It will also be appreciated that the locking element 47 prevents the shaft 13 and the bearing 15 from being mounted in the tubular casing 11 after the tubular casing 11 has been locked on the body 3. If the tubular casing 11 is locked on the body 3 in the absence of the drive shaft 13 and the bearing 15, the insertion of the bearing 15, together with the shaft 13, inside the portion 18 is stopped owing to the fact that the bent lugs 71 abut, at the free end thereof, the stop edge 59 of the locking element 47.

It will be further appreciated that this arrangement secures the handling of the drive shaft 13 and the cutting element thereof by the user, if the user were to be tempted to mount the shaft in the tubular casing whilst the main shaft 41 was rotating.

What is claimed is:

1. Tool for a food processing machine, comprising
   a tubular casing,
   a drive shaft for rotatingly driving a food processing element, and
   a centering and guiding element which ensures that the drive shaft is mounted for rotation in the tubular casing,
   the tubular casing and the drive shaft being provided, at the same first end, with removable means for locking to a machine body and releasable means for coupling to a main shaft of the machine, respectively,
   the centering and guiding element comprising removable means for fixing to the tubular casing in order to allow the drive shaft to be disassembled from the tubular casing,
   characterised in that the centering and guiding element is mounted in the tubular casing at a side of the first end, and the fixing means thereof are suitable for being locked in a correct position for fixing to the tubular casing by complementary locking means provided on the machine body when the tubular casing is fixed to the machine body in order to prevent the drive shaft from becoming inadvertently disassembled from the tubular casing when the tool is operated.

2. Tool according to claim 1, characterised in that the fixing means of the centering and guiding element are suitable for preventing the tubular casing from being fixed to the machine body when the fixing means are in an incorrect position for fixing to the tubular casing.

3. Tool according to claim 2, characterised in that the fixing means of the centering and guiding element are suitable for preventing the drive shaft and the main shaft from being coupled when the fixing means are in an incorrect position for fixing to the tubular casing.

4. Tool according to claim 1, characterised in that the centering and guiding element comprises a ring and a roller bearing which is arranged in the ring and which receives the drive shaft for rotation, and in that the tubular casing is provided with a radial shoulder which forms an axial stop, whilst the fixing means comprise at least one resilient lug which protrudes axially from the ring, the resilient lug having a free end which is turned at the side of the first end, the resilient lug being provided with a complementary hook for the radial shoulder and being capable of being deflected in a radial manner between a rest position, in which the hook is able to co-operate with the shoulder of the tubular casing in order to define the correct position for fixing the centering and guiding element in the tubular casing, and an inwardly bent position.

5. Tool according to claim 1, characterised in that the means for locking the tubular casing to the machine body comprise, at the side of the first end, at least one flexible axial resilient arm which is provided with a hook which is able to co-operate with a complementary shoulder of the machine body in order to form a snap-fitting connection.

6. Food processing machine, characterised in that it comprises a tool according to claim 1, a machine body to which the tool is removably fixed, and complementary means for locking the means for fixing the drive shaft in the tubular casing, the locking means being provided on the machine body.

7. Machine according to claim 6, characterised in that the complementary locking means are suitable for co-operating with the means for fixing the centering and guiding element in order to prevent the tubular casing from being fixed to the machine body if the fixing means are in an incorrect position for fixing to the tubular casing.

8. Machine according to claim 7, characterised in that the complementary locking means are suitable for co-operating with the means for fixing the centering and guiding element in order to prevent the drive shaft and the main shaft from being coupled when the fixing means are in an incorrect position for fixing to the tubular casing.

9. Machine according to claim 6, in which the tool is further characterised in that the centering and guiding element comprises a ring and a roller bearing which is arranged in the ring and which receives the drive shaft for rotation, and in that the tubular casing is provided with a radial shoulder which forms an axial stop, whilst the fixing means comprise at least one resilient lug which protrudes axially from the ring, the resilient lug having a free end which is turned at the side of the first end, the resilient lug being provided with a complementary hook for the radial shoulder and being capable of being deflected in a radial manner between a rest position, in which the hook is able to co-operate with the shoulder of the tubular casing in order to define the correct position for fixing the centering and guiding element in the tubular casing, and an inwardly bent position, said machine being characterised in that the locking means comprise a rigid wall which is fixedly connected to the machine body and which extends axially at the side of the end at which the main shaft is coupled to the drive shaft of the tool, the wall being suitable for blocking the deflection of the resilient lug when in a completely assembled position which corresponds to the correct position for fixing the ring in the tubular casing and to the position for locking the tubular casing to the machine body.

10. Machine according to claim 9, characterised in that the rigid wall has an outer surface which substantially comes into contact with the inner surface of the resilient lug, in the completely assembled position.

11. Machine according to claim 9, characterised in that the rigid wall is a cylindrical wall which is coaxial with the main shaft and which has an outside diameter which is substantially equal to, whilst being less than, the distance from the inner surface of the resilient lug to axis of the drive shaft.

12. Machine according to claim 9, characterised in that the main shaft is provided with a driving means such that the end of the drive shaft of the tool and the driving means co-operate, when in a completely assembled position, over an axial driving length, and in that, when in a completely assembled position, the rigid wall covers the resilient lug over an axial interference length, so that the interference length is greater than the driving length.

* * * * *